(12) United States Patent
Janus et al.

(10) Patent No.: US 6,383,241 B1
(45) Date of Patent: May 7, 2002

(54) PROTECTIVE FILTRATION SYSTEM FOR ENCLOSURES WITHIN BUILDINGS

(75) Inventors: Michael Christopher Janus, Fallston; Craig A. Myler, Forest Hill, both of MD (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/504,916

(22) Filed: Feb. 16, 2000

(51) Int. Cl.$^7$ .............................................. B01D 46/10
(52) U.S. Cl. ................ 55/385.2; 55/471; 55/DIG. 18; 454/187
(58) Field of Search .................... 55/385.2, DIG. 18, 55/DIG. 46, 471, 472, 473, 325.1; 454/187

(56) References Cited

U.S. PATENT DOCUMENTS

| | | |
|---|---|---|
| 1,270,613 A | 6/1918 | Gustavson |
| 2,341,113 A | 2/1944 | Nelson |
| 2,561,592 A | 7/1951 | Palmer |
| 3,120,167 A | 2/1964 | Kearny |
| 3,204,546 A | 9/1965 | Krell |
| 3,766,844 A | 10/1973 | Donnelly et al. |
| D229,183 S | 11/1973 | Papst |
| 4,191,543 A | 3/1980 | Peters |
| 4,344,484 A | 8/1982 | Deckas et al. |
| 4,483,273 A | 11/1984 | Develle et al. |
| 4,548,627 A * | 10/1985 | Landy ...................... 55/385.2 |
| 4,560,395 A | 12/1985 | Davis |
| 4,620,869 A | 11/1986 | Goossens et al. |
| 4,626,262 A * | 12/1986 | Forss ....................... 55/385.2 |
| 4,626,265 A * | 12/1986 | Adiletta .................... 55/385.2 |
| 4,724,749 A | 2/1988 | Hedrick |
| 4,790,863 A | 12/1988 | Nobiraki et al. |
| 4,905,578 A | 3/1990 | Curtis et al. |
| 4,961,766 A * | 10/1990 | Hogan ...................... 55/385.2 |
| 5,099,751 A | 3/1992 | Newman et al. |
| 5,215,498 A | 6/1993 | Wong et al. |
| 5,297,990 A | 3/1994 | Renz et al. |
| 5,322,533 A * | 6/1994 | Todorovic ................. 55/385.2 |
| 5,385,505 A | 1/1995 | Sharp et al. |
| 5,459,943 A * | 10/1995 | Tanahashi ................. 55/385.2 |
| 5,462,484 A | 10/1995 | Jung et al. |
| 5,538,471 A | 7/1996 | Guiles |
| 5,545,086 A | 8/1996 | Sharp et al. |
| 5,558,112 A * | 9/1996 | Strieter .................... 55/385.2 |
| 5,792,226 A | 8/1998 | Lee et al. |
| 5,843,196 A * | 12/1998 | Leavey et al. ............. 55/385.2 |
| 5,843,197 A * | 12/1998 | Rossnagel ................. 55/385.2 |
| 5,876,279 A | 3/1999 | Renz et al. |

FOREIGN PATENT DOCUMENTS

FR 2 653 354 4/1991

* cited by examiner

Primary Examiner—David A. Simmons
Assistant Examiner—Minh-Chau Pham
(74) Attorney, Agent, or Firm—William B. Richards; Courtney J. Miller

(57) ABSTRACT

A low-cost, portable filtration system for supplying collective protection to a single room inside a residential or commercial building which includes an air-impermeable panel, a filtration assembly for removing airborne biological or chemical agents mounted within the impermeable panel, and an adjustable frame, adapted to be mounted in an opening to the enclosure, for supporting the impermeable panel and the filtration assembly. The filtration assembly includes at least one filtration unit and a blower mounted either upstream or downstream from the filtration unit as well as a pressure gauge for measuring the pressure differential across the impermeable panel after the system is installed, and a control module for controlling the speed of the blower. The individual components of this invention are packaged as a portable kit and may be rapidly assembled and installed in the event of biological or chemical airborne contamination of the interior of a building.

18 Claims, 3 Drawing Sheets

PROTECTIVE FILTRATION SYSTEM FOR ENCLOSURES WITHIN BUILDINGS

The invention was not made by an agency of the United States Government nor under contract with an agency of the United States Government.

BACKGROUND OF THE INVENTION

This invention relates to devices and methods for protecting enclosures within buildings from airborne contaminants such as the highly toxic chemical agents sarin, soman, and VX, and the highly infectious biological agent anthrax.

The recent increase in terrorist activity throughout the world poses a serious threat to virtually every member of society. Although many terrorist activities utilize bombs or other explosive devices, there is an increasing concern that devices which release chemical or biological agents will become the weapons of choice for terrorists. Chemical or biological weapons are most destructive when deployed in highly populated areas such as cities. If such a device is activated or detonated near or within an enclosed area, such as an office or apartment building, a chemical or biological agent may rapidly affect many of the building's occupants. The interior of a building can be a particularly dangerous environment in the event of a chemical or biological attack because the contamination may spread much more quickly than the occupants can be evacuated from the building. Furthermore, a building's HVAC system may actually speed dispersion of the contaminant if the system fails to remove the contaminant, or if there is no other means of containment or decontamination within the building.

Currently, many residential, commercial, and government buildings have not implemented measures to quickly and effectively contain airborne chemical or biological agents should such agents be released into the environment. Therefore, there is a need for a portable, highly effective system which can be quickly installed within residential, commercial, or government buildings to protect the occupants from exposure to airborne highly toxic chemical agents or highly infectious biological agents following contamination of the environment with such agents.

A variety of devices for purifying the airflow into or out of an enclosure are available. U.S. Pat. No. 4,790,863 to Nobiraki et al. discloses a thin, lightweight fan module having one or more fans contained within a casing; a thin, lightweight air filter module, and a porous air flow moderator disposed between the fan module and the air filter module. U.S. Pat. No. 4,905,578 to Curtis et al. discloses an apparatus for ventilating controlled areas that includes a blower located in an enclosure. U.S. Pat. No. 5,462,484 to Jung et al. discloses a self-contained air cleaning system for use in clean rooms, as does U.S. Pat. No. 5,876,279 to Renz et al. However, the prior art does not provide for a portable kit which can be quickly assembled and installed in any room within a building, and which contains all of the items needed to effectively protect the occupants from exposure to dangerous biological or chemical agents.

SUMMARY OF THE INVENTION

Accordingly, these and other disadvantages of the prior art are overcome by the present invention which provides a low-cost, portable filtration system for supplying [expedient] collective protection to a single room inside a residential, commercial, or government building. In a preferred embodiment of the present invention the protective filtration system is intended for installation in an interior door or window and includes an air-impermeable panel, a filtration assembly mounted within the air-impermeable panel for removing highly toxic chemical agents or highly infectious biological agents, and an adjustable frame for supporting the air-impermeable panel and the filtration assembly. The filtration assembly of the present invention includes at least one filtration unit suitable for removing highly toxic chemical agents or highly infectious biological agents, and a blower mounted either upstream or downstream from the filtration unit for pulling air through the filtration unit and providing overpressure to the protected room. A preferred embodiment of the present invention further includes a pressure gauge for measuring the pressure differential across the impermeable panel after the system is installed, and a control module for controlling the variable speed of the blower. In a preferred embodiment, the individual components of this invention are disassembled and packaged as a kit which is portable, and which may be rapidly assembled and installed to protect a single room in the event of biological or chemical contamination of the interior or exterior of a building.

Therefore, an object of the present invention is to provide a low-cost, portable filtration system capable of supplying collective protection to a single room inside a building by (i) positively pressurizing the room to minimize air leakage pathways, and (ii) purifying the air that passes into the room by means of a filtration assembly.

A further object of the present invention is to provide a protective action alternative that offers higher protection than sheltering-in-place or recirculation filters, at a much lower cost and complexity than a military-grade collective protection system.

Another object of the present invention is to provide a portable kit, the components of which can be rapidly assembled and installed to supply clean, pressurized air to a room of small volumetric proportions and low infiltration.

Further objects, advantages, and novel aspects of this invention will become apparent from a consideration of the drawings and subsequent detailed description.

REFERENCE NUMERALS

10 Protective Filtration System
12 Control Module
14 Pressure Gauge
16 Adjustable Frame
18 Impermeable Panel
19 Opening
20 Filtration Assembly
21 Support Panel
22 Blower
24 First Casing
26 First Filtration Unit
28 Second Filtration Unit
30 Second Casing
32 Sleeve
34 Carrying Case

Reference will now be made in detail to the present preferred embodiment to the invention, examples of which are illustrated in the accompanying drawings.

DETAILED DESCRIPTION OF THE INVENTION AND BEST MODE

Figure 1:
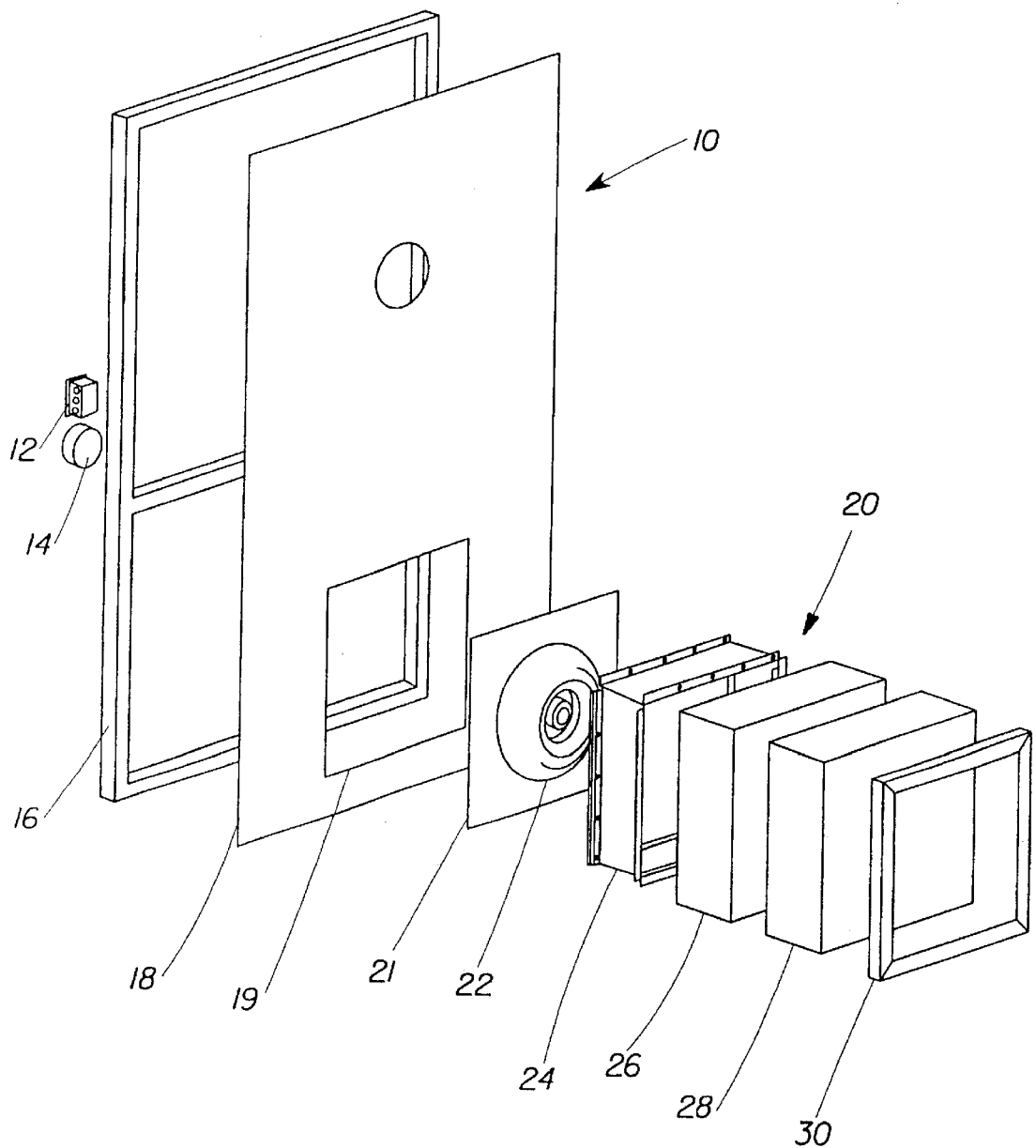
FIG. 1 is an exploded view of the protective filtration system according to the teachings of the present invention. In this illustration the fan is located downstream from the filtration units.

As illustrated in FIG. 1, a protective filtration system 10 according to a preferred embodiment of the present invention comprises an adjustable frame 16 over which impermeable panel 18 is draped prior to the installation of adjustable frame 16 in the opening of a window or door. After impermeable panel 18 is draped over adjustable frame 16, adjustable frame 16 is inserted into the opening of either a door or window and adjusted to the size required to secure impermeable panel against adjustable frame 16.

As also illustrated in FIG. 1, filtration assembly 20, according to a preferred embodiment of the present invention, is inserted through opening 19 and mounted to adjustable frame 16. Filtration assembly 20 includes support panel 21, blower 22, first casing 24, first filtration unit 26, second filtration unit 28, and second casing 30. Filtration assembly 20 is constructed as follows: blower 22 is mounted within support panel 21 which is then secured against first casing 24. First filtration unit 26 is inserted into first casing 24, and second filtration unit 28 is inserted into first casing 24 such that the two filtration units are situated adjacent to one another and upstream from blower 22 within first casing 24. Second casing 30 is mounted onto first casing 24 opposite blower 22, and secures both filtration units within first casing 24. As stated, the complete filtration assembly 20 is then inserted through opening 19 and mounted to adjustable frame 16. Control module 12 and pressure gauge 14 are then mounted to adjustable frame 16. Control module 12 is connected both to a suitable power source and to blower 22. Pressure gauge 14 is attached to a conduit which passes through an aperture in impermeable panel 18 to the environment outside of the protected room.

Figure 2:
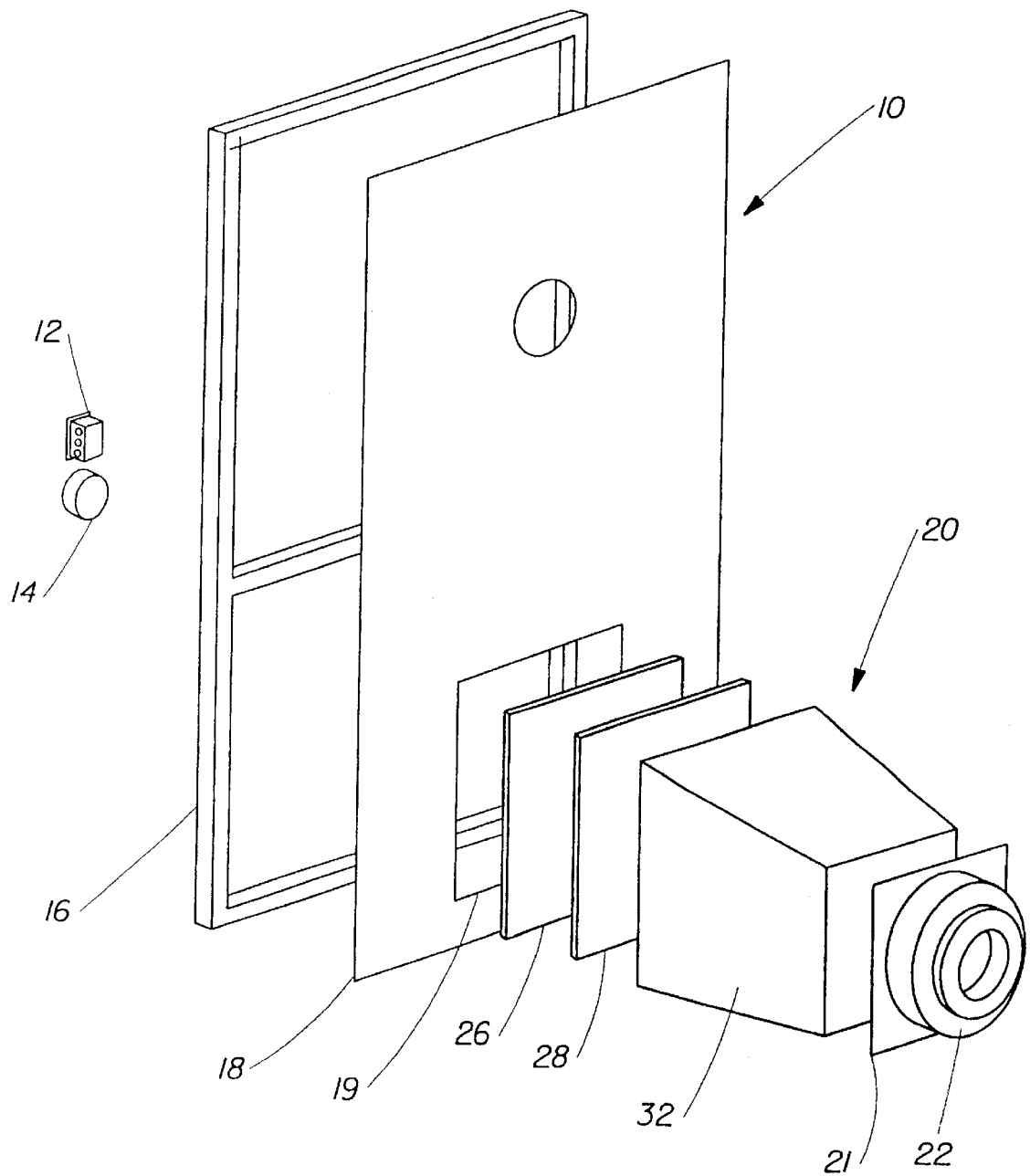
FIG. 2 is an exploded view of an alternate embodiment of the protective filtration system according to the teachings of the present invention. In this illustration the fan is located upstream from the filtration units and is connected to the filtration units by a sleeve.

FIG. 2 illustrates an alternate embodiment of protective filtration system 10 in which first filtration unit 26 and second filtration 28 are mounted within first casing 24 and second casing 30 which are both housed within sleeve 32. Support panel 21 which contains blower 22 is mounted on sleeve 32 opposite the filtration units. In this embodiment, the orientation of the blower and filtration units is reversed from the embodiment shown in FIG. 1.

Figure 3:
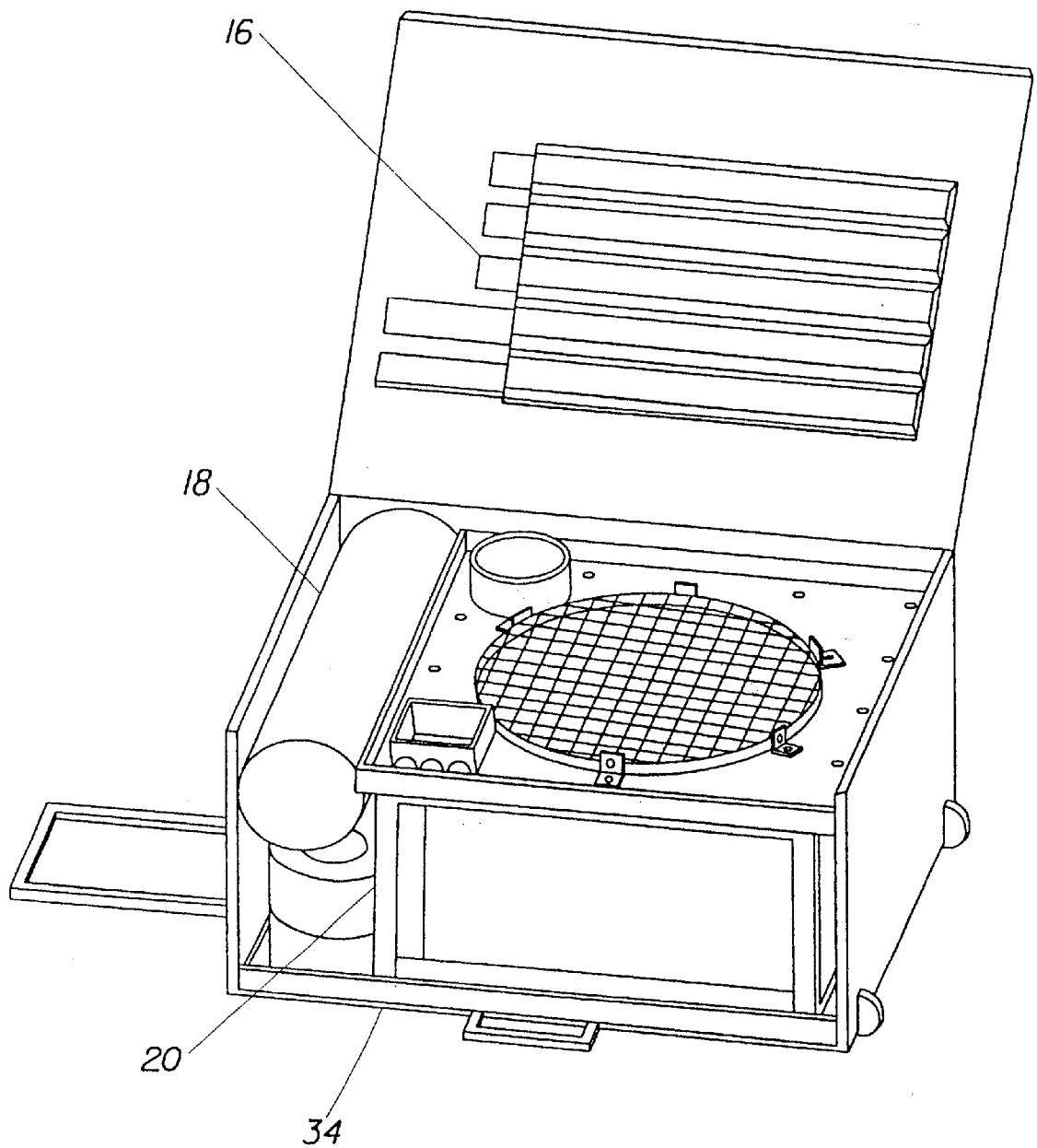
FIG. 3 depicts an embodiment of the present invention in which the various components are disassembled and stored in a portable carrying case.

The operation of a preferred embodiment of protective filtration system 10 is described as follows. In the event of airborne contamination or threat of airborne contamination, the protective filtration system kit shown in FIG. 3 is transported to the area to be protected and the component parts of the system are removed and quickly assembled. A preferred embodiment of the present invention is intended to protect a single enclosure on the interior of a building such as a room or a closet, or any other suitable enclosure having at least opening, such as a vent, window, or door in which protective filtration system 10 may be installed. Adjustable frame 16 is expanded to the desired dimensions and impermeable panel 18 is draped over adjustable frame 16 which is then inserted into a opening such as a door or window. Filtration assembly 20 is inserted though opening 19 and mounted to adjustable frame 16. In the kit embodiment of the present invention, filtration assembly 20 is preassembled or filtration assembly 20 may be assembled as described above. Control module 12 and pressure gauge 14 are installed as described above, and power is then supplied to blower 22. In a preferred embodiment, blower 22 operates on standard 110 VAC and provides about 1000 to 2000 cfm of airflow to create an overpressure of about 0.01 to 0.5 inches of water gauge within the protected room. The level of overpressure required will depend on the characteristics of the protected room.

To maximize the effectiveness of protective filtration system 10, all air passageways leading into and out of the room or enclosure to be protected must be sealed to prevent or reduce air infiltration. Sealing the room to be protected is accomplished with polyethylene sheeting and adhesive tape which may be included as a component of the kit embodiment of the present invention.

The preferred embodiment of the present invention is intended to provide protection to a single interior room within a building. Following installation, protective filtration system 10 cannot be removed until the threat of contamination has passed; therefore, individuals desiring the benefits of protective filtration system 10 should gather in the room to be protected prior to the installation of the system or select a room with multiple exits. In a preferred embodiment, the present invention should be installed in a room that has a minimal quantity of air infiltration and a door that is not positioned on an outside wall. The ideal, but not the only, location for installation of protective filtration system 10 is the door of a room that has no walls, windows, doors, or vents that are exterior to the building housing the room to be protected. In this preferred embodiment, it is important that the system is placed on an inner door so that the filtration system provides the maximum possible protection.

The present invention has numerous advantages over prior art devices which attempt accomplish similar objectives. For example, prior to the capability offered by the present invention, the burden of filtering airborne contaminants rested solely on sheltering-in-place methods, recirculation filters, building HVAC systems, or military-grade collective protection, if such systems existed for a particular building. Furthermore, the aforementioned filtration systems are not portable, cannot be quickly installed in windows or doors, and may not be effective or efficient in providing protection against both highly toxic chemical agents and highly infectious biological agents. The present invention, however, is self-contained and can be installed independently of any existing air handling system to provide a single room with both overpressure and high efficiency filtration of airborne chemical and biological agents. Additionally, the present invention is inexpensive, portable, and may be rapidly assembled and installed in any window or door located within a building.

While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention. Various changes may be made to the present invention without departing from the scope of the invention, and the following are examples of such changes.

As illustrated in FIG. 1, according to a preferred embodiment of the invention, filtration assembly 20 is oriented such that the filtration units are is located inside the room to be protected, and blower 22 is located downstream of the filtration units. As illustrated in FIG. 2, in an alternate embodiment of this invention, the filtration units and casings are connected to blower 22 by a sleeve with the blower being upstream from the filtration units. In still another embodiment, protective filtration system 10 is permanently mounted to the doorframe in which it was installed.

A preferred embodiment of the present invention utilizes polyethylene as the material for the air-impermeable panel that is draped over the adjustable doorframe. Alternate embodiments of the present invention utilize plastic, polymer, rubber, or any other suitable air-impermeable material for the impermeable panel. Polyethylene is also utilized in the preferred embodiment as the material used to seal off any air intake or outflow routes present in the protected room. Alternate embodiments of the present invention utilize plastic, polymer, rubber, or any other suitable air-impermeable material to seal the room or enclosure to be protected by this invention.

In a preferred embodiment of this invention, the control module is a commercially available fan rheostat that controls the airflow of the fan which provides the desired overpressure to the protected room. In an alternate embodiment of this invention the control module is any suitable mechanical, electrical, analog, or digital device capable of controlling the operation and airflow of the blower to provide the desired overpressure to the protected room.

A preferred embodiment of this invention utilizes a commercially available MAGNEHELIC differential pressure gauge by Dwyer Instruments, Inc. of Michigan City, Ind. installed in the impermeable panel to measure the pressure differential across the panel (i.e., between the protected room and the contaminated area). In an alternate embodiment of this invention the pressure gauge is any suitable device that permits the user to determine the pressure difference between the external contaminated environment and the internal protected environment.

A preferred embodiment of this invention utilizes a mechanical fan which provides about 1000 to 2000 cfm of airflow to create an overpressure of about 0.01 to 0.5 inches of water gauge within the protected room. In an alternate embodiment of this invention the fan is replaced by any suitable blower or airflow creating device that will provide the desired overpressure to the protected room such that air infiltration is minimized and the effectiveness of the protective filtration system is maximized.

In a preferred embodiment of this invention there are two separate filtration units: a carbon filtration unit for removing chemical contaminants from the air drawn into the protected room, and a particulate media filtration unit for removing biological contaminants from the air drawn into the protected room. Alternate embodiments of the present invention include at least one stage of filtration, and utilize any single filtration material or combination of suitable filtration materials that provide the desired filtration efficiency to the protected enclosure. The filter media chosen will be dependent upon the potential threat scenario. Another embodiment of the present invention utilizes replaceable or substitutable filtration units, while still another embodiment utilizes permanent filtration units that cannot be replaced once the system is installed.

We claim:

1. A filtration system for protecting an enclosure from airborne contaminants, the enclosure having at least one opening, the system comprising:
   an impermeable panel formed to include an aperture therethrough;
   a filtration assembly, adapted to be mounted within the aperture, for removing airborne contaminants from the air; and
   a frame for supporting the panel, the frame adapted to be secured to at least one opening of the enclosure and adjustable to the area of the opening, whereby the enclosure is maintained at a positive pressure relative to the environment outside the enclosure.

2. The system of claim 1, wherein the frame is adjustable in two dimensions, whereby the frame substantially fits the opening in the enclosure.

3. The system of claim 2, wherein the frame further comprises a plurality of strips.

4. The system of claim 1, wherein the filtration assembly further comprises:
   a filtration unit and
   a blower in fluid communication with the filtration unit.

5. The system of claim 1, further comprising a means for measuring a pressure differential between the interior of the enclosure and the outside environment.

6. The system of claim 4, further comprising a control module for controlling the blower.

7. The system of claim 4, further comprising a means for measuring a pressure differential between the interior of the enclosure and the outside environment and wherein the control module is adapted to communicate with the pressure differential measuring means and to communicate with the blower.

8. The system of claim 7, wherein the control module controls the blower to maintain the positive pressure within the enclosure relative to the environment outside the enclosure.

9. The system of claim 8, wherein the positive pressure is about 0.01 to about 0.5 inches of water.

10. The system of claim 4, wherein the blower is adapted to provide about 1000 to about 2000 cubic feet of flow per minute.

11. The system of claim 1, further comprising a hand-carryable case, the case adapted to contain the panel, the filtration assembly, and the frame.

12. The system of claim 11, wherein the case further comprises a carrying handle operatively secured thereto.

13. A portable kit for protecting an enclosure from airborne contaminants by maintaining a positive pressure within the enclosure relative to the environment outside the enclosure, the enclosure having at least one opening, the kit comprising:
   an impermeable panel formed to include an aperture therethrough;
   a filtration assembly adapted to be mounted within the aperture for removing airborne contaminants from the air;
   a frame for supporting the panel, the frame adapted to be mounted on at least one opening of the enclosure and adjustable to the area of the opening; and
   a hand-carryable case, the case adapted to contain the panel, the filtration assembly, and the frame.

14. The kit of claim 13, wherein the filtration assembly further comprises means for measuring a pressure differential across the panel.

15. The kit of claim 13, further comprising a control module adapted to communicate with the blower and the pressure differential measuring means, wherein the control module controls the blower to maintain the positive pressure within the enclosure relative to the outside environment.

16. A method for protecting an enclosure from airborne contaminants, the enclosure having at least one opening, the method comprising the steps of:
   (a) fitting an impermeable panel, having a an aperture therethrough, over an adjustable frame;

(b) securing the adjustable frame to cover at least one opening of the enclosure; and (c) installing an filtration assembly in the aperture, the filtration assembly further comprising at least one filtration unit and a blower for moving air through the filtration unit, whereby the enclosure is maintained at a positive pressure relative to the outside environment, and whereby all or a portion of the airborne contaminants are removed from the air supplied to the enclosure.

17. A portable kit for protecting an enclosure from airborne contaminants, the enclosure having at least on opening, the kit comprising:

an impermeable panel formed to include an aperture therethrough;

a filtration assembly adapted to be mounted within the aperture for removing airborne contaminants from the air;

adhesive tape for mounting the panel on at least one opening of the enclosure; and a hand-carryable case, the case adapted to contain the panel, the filtration assembly, and the tape, wherein the kit is hand-carryable.

18. The portable kit of claim 17, further comprising a supply of adhesive tape for sealing the enclosure, wherein the hand-carryable case is further adapted to contain the tape.

* * * * *